United States Patent [19]
Meyer

[11] Patent Number: 5,285,424
[45] Date of Patent: Feb. 8, 1994

[54] WIDE BANDWIDTH FIBER OPTIC HYDROPHONE

[75] Inventor: A. Douglas Meyer, West Hills, Calif.

[73] Assignee: Litton Systems, Inc., Beverly Hills, Calif.

[21] Appl. No.: 997,237

[22] Filed: Dec. 28, 1992

[51] Int. Cl.$^5$ .................. G01B 9/02; H04R 23/00; H04B 13/00

[52] U.S. Cl. .................. 367/149; 356/345; 250/227.19; 73/655

[58] Field of Search .............. 367/149, 140; 356/345; 73/653, 655; 250/227.16, 227.18, 227.19, 227.27

[56] References Cited

U.S. PATENT DOCUMENTS

| | | | |
|---|---|---|---|
| 4,525,818 | 6/1985 | Cielo et al. | 367/149 |
| 4,570,248 | 2/1986 | Assard | 367/149 |
| 4,799,752 | 1/1989 | Carome | 356/345 |
| 4,893,930 | 1/1990 | Garrett et al. | 250/227.19 |
| 4,951,271 | 8/1990 | Garrett et al. | 367/149 |
| 5,155,548 | 10/1992 | Danver et al. | 356/345 |

Primary Examiner—Ian J. Lobo
Attorney, Agent, or Firm—Lynn & Lynn

[57] ABSTRACT

Optical fiber coils are formed on inner and outer mandrels. The inner mandrel is spaced apart from the outer mandrel to form a cavity between them with the inner fiber coil being inside the cavity. Water-tight seals between the inner and outer mandrels keep the inner coil isolated from underwater acoustic waves that may be incident upon the outer coil. The optical fibers are included in a dual optical path fiber optic interferometer that includes the inner fiber coil in a first optical path and the outer fiber coil in a second optical path. A central wall divides the inner region of the inner mandrel into two cavities. A tie rod has a first end connected to the wall and a second end extending out of the first cavity in the inner mandrel. A backshell is connected to the second end of the tie rod. The backshell includes a hollow portion formed as a housing for protecting fiber optic components of the interferometer.

8 Claims, 3 Drawing Sheets

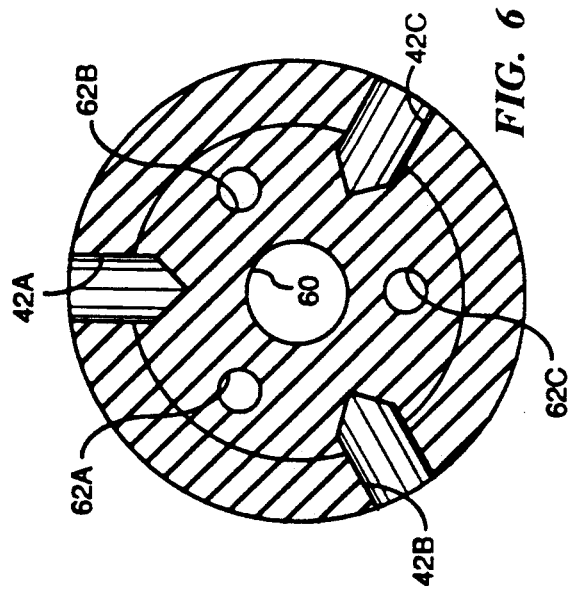
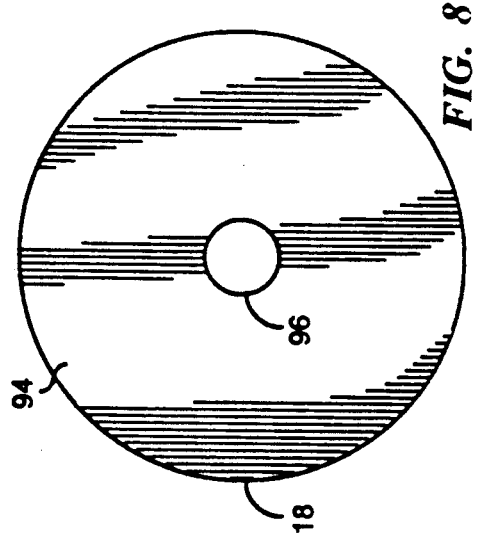
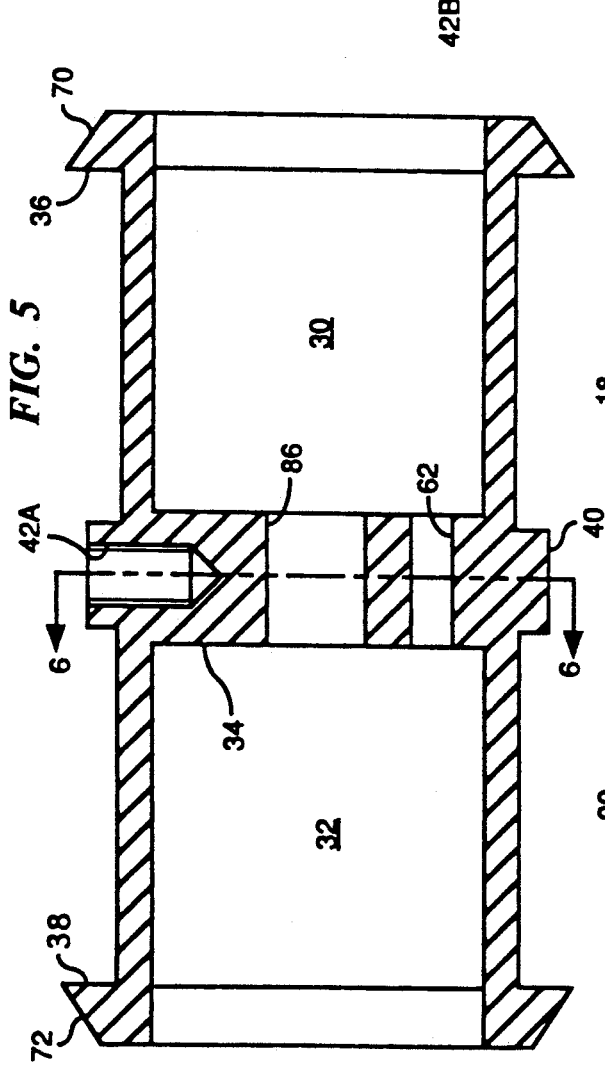
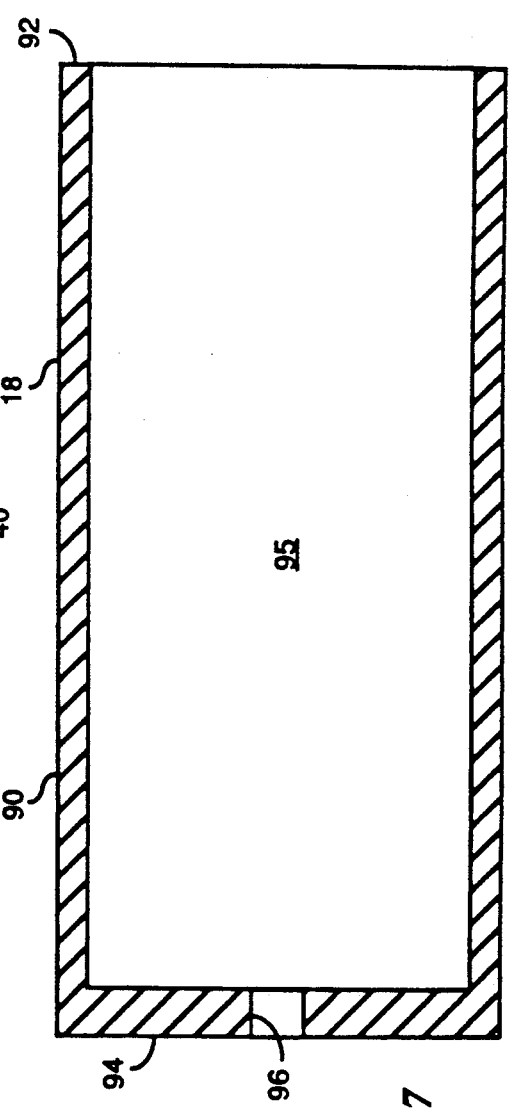

WIDE BANDWIDTH FIBER OPTIC HYDROPHONE

This invention was made with support under contract N00014-87-C-2223 awarded by the Naval Research Laboratory. The United States government has certain rights in this invention.

BACKGROUND OF THE INVENTION

The invention relates generally to a fiber optic hydrophone that is acceleration-insensitive and is adaptable for use in noisy environments. The invention relates particularly to a fiber optic hydrophone having a rigid mandrel and compliant backed cavities to provide enhanced acoustic sensitivity.

The conventional method for underwater sound detection employs piezoelectric transducers, along with associated electronics. Because conventional sensors are electrically active, it is required that power be supplied to the sensors underwater, which causes additional weight, complexity, and cost. Further, conventional systems have low reliability because seals in the underwater hydrophones may leak and cause equipment malfunctions. In addition, conventional sensor have limited sensitivities and are susceptible to electromagnetic pickup.

Fiber optic hydrophones are disclosed in U.S. Pat. Nos. 4,525,818 and 4,570,248. The size of prior art fiber optic hydrophones has limited the directional response has been limited to low frequencies.

SUMMARY OF THE INVENTION

A wide bandwidth fiber optic hydrophone according to the present invention includes an inner mandrel formed generally as a hollow cylinder. A first optical fiber has a portion formed in an inner fiber coil about the inner mandrel. An outer mandrel is formed generally as a hollow cylinder so that the inner mandrel fits within the outer mandrel. The invention includes means for spacing the inner mandrel apart from the outer mandrel to form a cavity between the inner and outer mandrels so that the inner fiber coil is within the cavity. A second optical fiber has a portion formed in an outer fiber coil about the outer mandrel. The present invention further includes means for forming water-tight seals between the inner and outer mandrels. The optical fibers are included in a dual optical path fiber optic interferometer that includes the inner fiber coil in a first optical path and the outer fiber coil in a second optical path. The inner coil functions as a reference arm of the interferometer, and the outer coil functions as a sensing arm.

The fiber optic hydrophone according to the present invention may further comprise a wall inside the inner mandrel transverse to the longitudinal axis of the inner mandrel. The wall divides the inner region of the inner mandrel into first and second inner cavities. A tie rod has a first end connected to the wall and a second end extending out of the first cavity in the inner mandrel. A backshell is connected to the second end of the tie rod. The backshell includes a hollow portion formed as a housing.

A fiber optic coupler is placed inside the housing. The tie rod preferably has a longitudinal passage therethrough, and the first and second optical fibers each have an end that extends through the passage in the tie rod into the housing for connection to the fiber optic coupler.

The fiber optic hydrophone according to the present invention has an axis of symmetry. The effects of linear acceleration have equal and opposite effects on the portion of the coiled optical fibers on opposite sides of the axis of symmetry to provide insensitivity of the interferometer to linear acceleration.

The fiber optic hydrophone according to the present invention may further comprise a layer of an acoustic absorbing material connected between the backshell and the inner and outer mandrels.

The longitudinal passage through the tie rod may be sealed to prevent fluid communication between the interior of the inner mandrel and the interior of the housing.

An appreciation of the objectives of the present invention and a more complete understanding of the structure and method of operation of this invention may be had by studying the following description of the preferred embodiment and by referring to the accompanying drawings.

BRIEF DESCRIPTION OF THE DRAWINGS

FIG. 5 is a cross-sectional view of an inner mandrel that may be included in the apparatus of FIG. 1;

FIG. 6 is a cross-sectional view along line 6—6 of FIG. 5;

FIG. 7 is a cross-sectional view of a shell that may be connected to the inner and outer mandrels of FIGS. 1-6;

FIG. 8 is an end elevation view along line 8—8 of FIG. 7; and

DESCRIPTION OF THE PREFERRED EMBODIMENT

Figure 1:
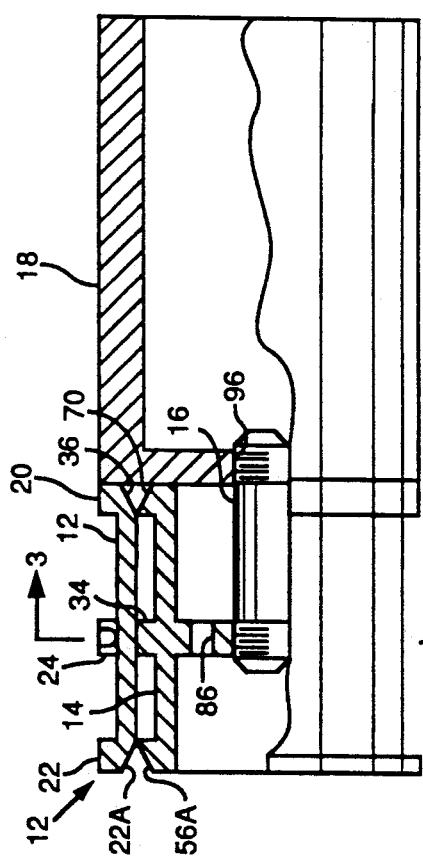
FIG. 1 is a partial cross-sectional view showing inner and outer mandrels, a tie rod and a shell around the outer mandrel that may be included in a fiber optic hydrophone according to the present invention.
Figure 9:
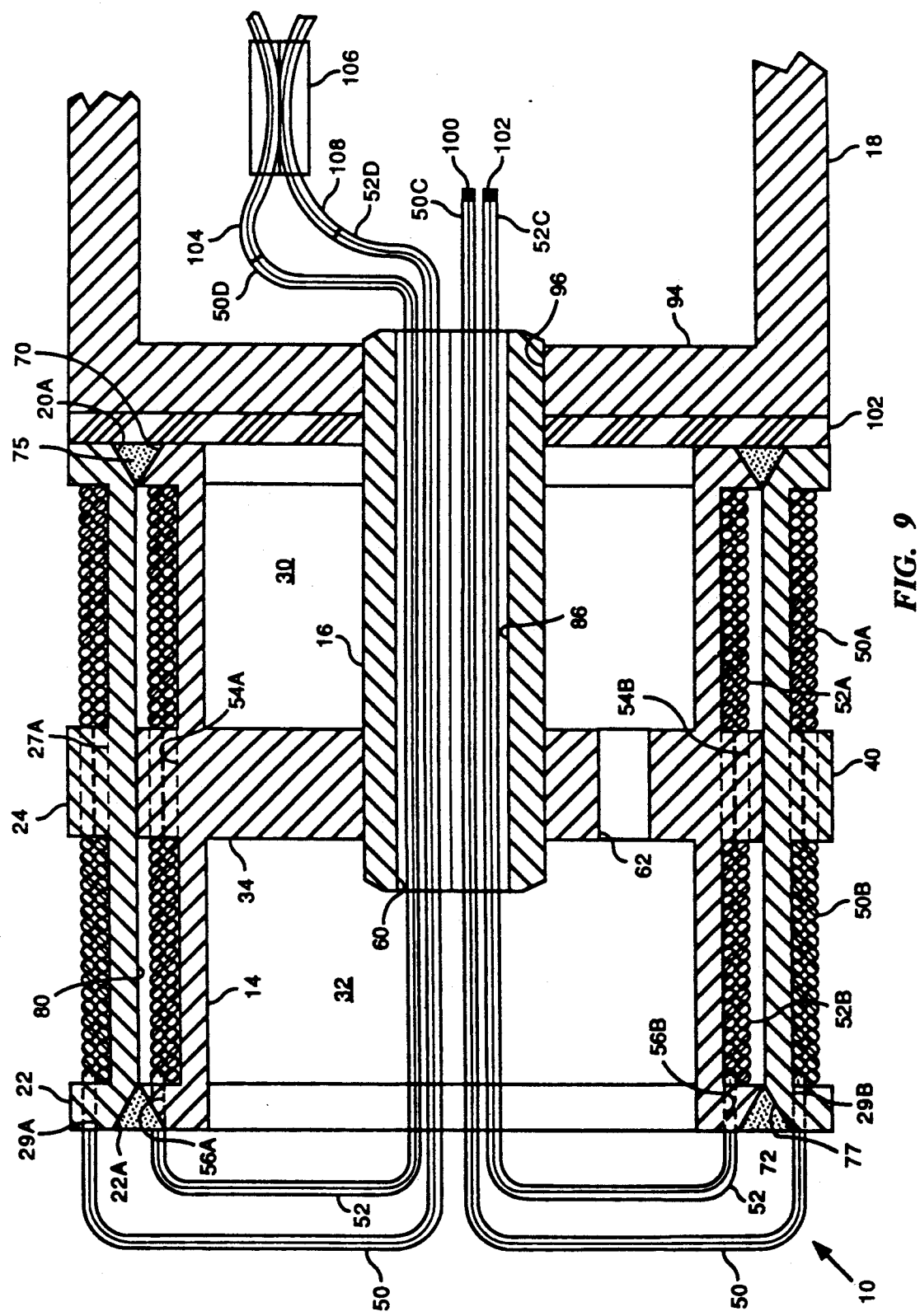
FIG. 9 schematically illustrates optical fibers wrapped around the outer and inner mandrels and coupled together to form an interferometer.

Referring to FIGS. 1 and 9, a sensor assembly 10 according to the present invention includes an outer mandrel 12, an inner mandrel 14, a tie rod 16 and a back shell 18. The outer mandrel 12, inner mandrel 14, tie rod 16 and back shell 18 are preferably formed of an aluminum alloy, but they may be made of other materials such as ceramics, plastics and various ferrous or nonferrous metals. In a preferred embodiment of the invention, the sensor assembly has an outside diameter of about 1.210 in. and a length of about 7.0 in.

Referring to FIGS. 1-3 and 9, the outer mandrel 12 preferably is formed generally as an open ended cylinder having outwardly extending end flanges 20 and 22. The end flanges 20 and 22 preferably have beveled inner edges 20A and 22A, respectively.

Figure 2:
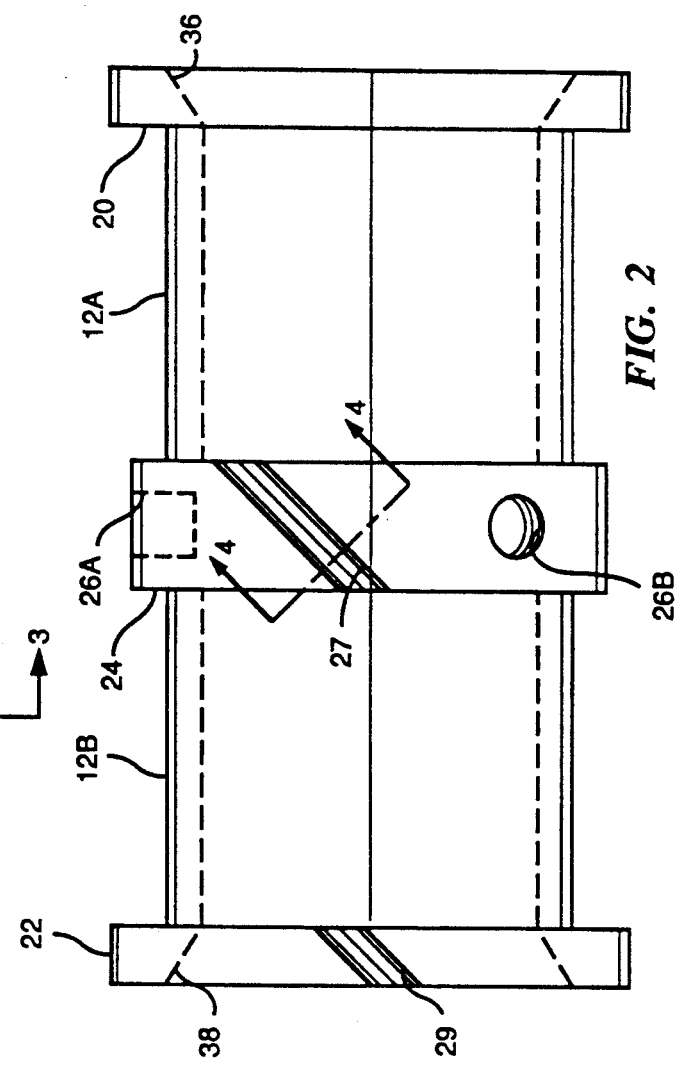
FIG. 2 is a side elevational view of an outer mandrel that may be included in the apparatus of FIG. 1, including a single layer coil of optical fiber wrapped around portions of the outer mandrel.

Referring to FIGS. 1 and 2, a boss 24 extends around the circumference of the outer mandrel 12 near the midpoint between the end flanges 20 and 22. The boss 24 divides the outer mandrel 12 into two generally cylindrical portions 12A and 12B that preferably have identical dimensions.

Figure 3:
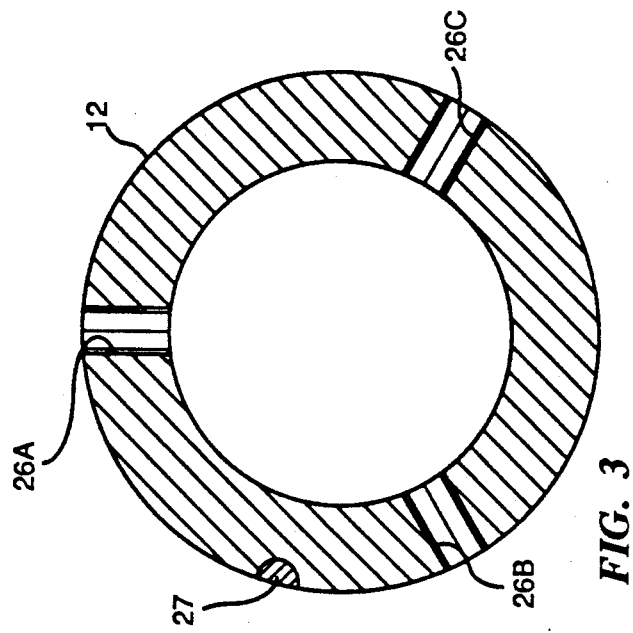
FIG. 3 is a cross-sectional view along line 3—3 of FIG. 2.

Referring to FIGS. 2 and 3, a plurality of passages 26A, 26B, etc. extend radially through the boss 24 into the interior region enclosed by the outer mandrel 12. As best shown in FIG. 3, a preferred embodiment of the invention has three such passages 26A, 26B and 26C having their center lines approximately 120° apart around the surface of the boss 24.

Figure 4:
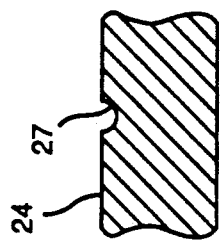
FIG. 4 is a partial cross-sectional view taken along line 4—4 of FIG. 3 to show a groove formed in a portion of the outer mandrel.

Referring to FIGS. 1-4, a groove 27A extends at an angle across the circumferential boss 24. The groove 27A may be generally semicircular in cross section as shown in FIG. 4. An optical fiber 50 is wound around the outer mandrel 12 in the region 12A between the flange 20 and the boss 24. The fiber 50 is then passed through the groove 27A over the boss 24 to the portion 12B of the outer mandrel 12 between the boss 24 and the flange 22. The angle of the longitudinal axis of the groove 27A with respect to the longitudinal axis of the outer mandrel 12 should be such that the optical fiber 50 at the end edges of the groove 27A is not bent at an angle that will cause radiation of light from the fiber 50 as it makes the transition through the boss 24 from one portion of the outer mandrel 12 to the other.

Referring to FIGS. 1, 3 and 9, a second groove 27B may be formed in the boss 24 at an angle opposite to that of the groove 27A. The second groove 27B may be positioned as shown in FIG. 3.

Referring to FIGS. 2 and 9, the outer mandrel 12 includes a pair of grooves 29A and 29B in the flange 22. After the optical fiber 50 is wound around the both portions 12A and 12B of the mandrel 12, the optical fiber 50 is passed through the grooves 29A and 29B and then routed into the interior of the inner mandrel 14.

For simplicity and clarity of illustration of the fiber 50 passing through the grooves 27A and 29A, FIG. 2 shows a one layer coil of optical fiber formed on the mandrel 12. However, referring to FIG. 9, a two layer coil is preferred. This two layer coil may be formed by starting with the center of the length of the fiber 50 being adjacent an inner edge of the flange 20 and winding the portions of the fiber 50 in opposite directions on each side of the center around the region 12A of the mandrel 12. One portion of the fiber 50 is then passed through the groove 27A in the boss 24. The other portion of the fiber 50 is passed through the groove 27B.

Referring to FIGS. 5 and 6, the inner mandrel 14 is also preferably formed generally as an open ended cylinder. The inner mandrel 14 encloses a pair of cylindrical cavities 30 and 32 that are separated by an inner wall 34. The inner mandrel 14 preferably has a pair of end flanges 36 and 38. The flanges 36 and 38 provide means for spacing the inner mandrel apart from the outer mandrel to form a cavity between the inner and outer mandrels 12 and 14, respectively.

A boss 40 extends around the outer portion of the inner mandrel 14 generally equidistant between the end flanges 36 and 38. The boss 40 divides the inner mandrel 14 into two generally cylindrical portions that have identical lengths and diameters. The boss 40 preferably is aligned with the inner wall 34 so that a threaded hole 42A through the boss 40 extends into the inner wall 34.

An optical fiber 52 is formed in double layer coils 52A and 52B on the inner mandrel 14 on each side of the boss 40. The coils 52A and 52B may be formed in the manner described above for forming coils on the outer mandrel 12. As shown in FIGS. 6 and 9, the boss 40 includes grooves 54A and 54B similar to the grooves 27A and 27B so that the fiber 52 may pass from one side of the boss 40 to the other. The end flange 38 also preferably includes grooves 56A and 56B where the fibers pass from the coiled region 52A into the inner portion of the inner mandrel 14.

The boss 24 preferably divides the inner mandrel 12 into

Referring to FIG. 6, the inner mandrel 14 preferably also has threaded holes 42B and 42C spaced apart around the boss 40. When the sensor assembly 10 is assembled, the holes 42A, 42B and 42C are in axial alignment with the holes 26A, 26B and 26C, respectively. Suitable bolts or screws (not shown) are passed through the holes 26A, 26B and 26C and engaged with the threaded holes 42A, 42B and 42C, respectively, to hold the assembled sensor 10 together.

The inner wall 34 also has a central bore 60 and three passages 62A, 62B and 62C that are parallel to the central bore 60. The central bore 60 is preferably threaded to receive an end of the tie rod 16 as explained subsequently. The three passages 62A, 62B and 62C may be conveniently spaced 120° apart as shown in FIG. 6. These passages 62A, 62B and 62C provide fluid communication between the cavities 30 and 32 when the sensor assembly is under water.

The end flanges 36 and 38 of the outer mandrel 12 preferably have beveled edges 70 and 72, respectively which facilitates insertion of the inner mandrel 14 into the outer mandrel 12. When the sensor 10 is fully assembled, the beveled edge 20A of the outer mandrel 22 and the beveled edge 70 of the inner mandrel 14 cooperate to form a circular cavity 75. The cavity 75 has a generally triangular cross section as shown in FIGS. 1 and 9. The cavity 75 preferably is filled with an adhesive that provides means for forming water-tight seals between the inner and outer mandrels, 12 and 14, respectively. The adhesive also holds the inner mandrels 12 and 14, respectively, together. The beveled edges 22B and 72 also cooperate to form a cavity 77 that is similar to the cavity 75. The cavity 77 also preferably is filled with an adhesive.

The adhesive-filled cavities 75 and 77 seal the region between the end flanges 36 and 38 to form a compliant air filled cavity 86 between the inner mandrel 12 and the outer mandrel 14. The fiber coils 52A and 52B are thus isolated from the environment outside the cavity 60. The fiber coils 50A and 50B are exposed to the environment.

Referring to FIG. 9, the fibers 50 and 52 are passed through a longitudinal bore 80 in the tie rod 16. A first end 50C of the fiber 50 is terminated in a mirror 100. Similarly a first end 52C of the fiber 52 is terminated in a mirror 102.

A second end 50D of the fiber 50 is spliced to a fiber 104 that is included in a fiber optic coupler 106. A second end 52D of the fiber 52 is spliced to a fiber 108 that is also included in the fiber optic coupler 106. The fiber optic coupler is preferably an evanescent field optical coupler. The fibers 50, 52, 104 and 108 are preferably single mode optical fibers.

These coiled portions of the optical fibers 50 and 52 and the coupler 106 form a fiber optic interferometer. In the embodiment shown and described, the interferometer is a Michelson interferometer. Either a Mach- Zehnder or Michelson interferometer configuration can be used without loss in generality. The Mach-Zehnder would require an additional coupler instead of the mirrors 100 and 102, the latter only one. In the illustrated embodiment, the fiber 50 forms the signal arm and the fiber 52 forms the reference arm of the Michelson interferometer. Acoustic waves incident upon the fiber 50 cause phase differences between light waves guided by the fiber 50 and the fiber 52. These phase changes may be monitored to measure changes in acoustic pressure in the vicinity of the sensor 10.

During assembly of the sensor 10, the inner mandrel 14 with the fiber coils 52A and 52B formed thereon may be slipped into the bore of the outer mandrel 12 and fixed into place with a suitable adhesive such as Ablestik 789-6M adhesive and three lock-screws. The tie-rod 16 is then threaded into the inner mandrel and locked in place. The fiber coils 50A and 50B may then be formed on the outer mandrel 12. This assembly of the outer and inner mandrels 12 and 14, respectively, the tie rod and the fiber coils 50A, 50B, 52A and 52B is then termed the sensor head.

Referring to FIGS. 7 and 8, the backshell 18 preferably is formed to have a generally cylindrical sidewall 90 and an open end 92. The other end of the backshell 18 comprises a plate 94 connected to the sidewall 90. The backshell 18 encloses a cavity 95 that is essentially cylindrical in shape. The plate 94 has a central passage 96 therethrough. The passage 96 is preferably threaded so that the backshell may be threadedly engaged with the tie rod 16.

The optical coupler 106 is then pulled through the central bore 86 of the tie-rod. The central area of the assembly is then filled with a resin compound, such as Chockfast Orange, which is a product of Philadelphia Resins Corp. However, this central region could be left unfilled and a 6 dB enhancement in sensitivity would be realized. The back shell 18 is then attached to the sensor head via the tie-rod 16. A layer 102 of compliant material may be placed between the sensor head and the back shell 18 for isolation purposes.

The coupler 106 and the mirrors 100 and 102 are enclosed in the cavity 95 enclosed by the backshell 18. The cavity 95 acts as a housing for the coupler 106, and the locations where the fibers 50 and 52 are spliced to the coupler 106. The back shell 18 protects the coupler 106 and the splices where the fibers 50 and 52 are connected to the coupler 106. The back shell 18 also provides an attachment point for the input and output fiber cables (not shown). This back shell 18 is preferably filled with Chockfast Orange to form a support matrix for the coupler 106, the splices and the cables.

An advantage of the sensor 10 is that it is insensitive to linear acceleration along its longitudinal axis. Accelerations insensitivity is achieved by forming the sensor head to be symmetrical. Because the inner and outer mandrels 12 and 14, respectively are fixed to each other, they will move as one body when accelerated. By attaching the tie rod 16 to the center of the sensor head, any acceleration is distributed symmetrically through the sensor head. That is, if the body were accelerated to the right as viewed in FIG. 9 for example; the side to the right of the symmetrical axis would compress while the side to the left would elongate. Therefore, the net overall length change is zero, resulting in acceleration insensitivity.

The present invention provides a compliant cavity backed sensor structure that enhances the sensitivity of either the sensing or reference arm of the interferometer. The hydrophone exhibits a frequency response out to 50 kHz and is substantially insensitive to linear acceleration. An omnidirectional response is also exhibited by this sensor. The sensor is both pressure and temperature tolerant. Working pressure and temperature of 1000 psig and $-3°$ C. to $+60°$ C., respectively, have been achieved.

Both the outer mandrel 12 and the inner mandrel 14 preferably have lengths of about 2.35 inches. The outer diameter of the outer mandrel 12 is preferably about 1.111 inches, and its inner diameter is about 1.051 inches. The preferred diameter of the boss 24 is about 1.15 inches, and the preferred diameter of the end flanges 20 is about 1.21 inches. The inner mandrel 14 has an outer diameter of about 1.001 inch.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A wide bandwidth fiber optic hydrophone, comprising:
   an inner mandrel formed generally as a hollow cylinder;
   a first optical fiber having a portion formed in an inner fiber coil about the inner mandrel;
   an outer mandrel formed generally as a hollow cylinder so that the inner mandrel fits within the outer mandrel;
   means for spacing the inner mandrel apart from the outer mandrel to form a cavity between the inner and outer mandrels, the inner fiber coil being within the cavity;
   a second optical fiber having a portion formed in an outer fiber coil about the outer mandrel;
   means for forming water-tight seals between the inner and outer mandrels; and
   a dual optical path fiber optic interferometer that includes the inner fiber coil in a first optical path and the outer fiber coil in a second optical path.

2. The fiber optic hydrophone of claim 1, further comprising:
   a wall inside the inner mandrel transverse to the longitudinal axis of the inner mandrel, the wall dividing the inner region of the inner mandrel into first and second inner cavities;
   a tie rod having a first end connected to the wall and having a second end extending out of the first cavity in the inner mandrel; and
   a backshell connected to the second end of the tie rod, the backshell including a hollow portion formed as a housing.

3. The fiber optic hydrophone of claim 2, wherein a fiber optic coupler is placed inside the housing and wherein the tie rod has a longitudinal passage therethrough, the first and second optical fibers each have an end that extends through the passage in the tie rod into the housing for connection to the fiber optic coupler.

4. The fiber optic hydrophone of claim 3 wherein the means for spacing the inner mandrel apart from the outer mandrel includes a pair of end flanges which extend outwardly from the inner mandrel to contact the inner walls of the outer mandrel when the inner mandrel is placed inside the outer mandrel.

5. The fiber optic hydrophone of claim 4, further comprising:
   a first circumferential boss between the end flanges of the inner mandrel to divide the inner mandrel into first and second inner spools, the inner circumferential boss having a groove therein extending between the first and second inner spools so that the first fiber may be wound around the first inner spool and then passed through the groove to the second inner spool;
   a pair of outer end flanges extending outwardly from the first mandrel;
   a second circumferential boss between the outer end flanges around the outer mandrel to divide the outer mandrel into first and second outer spools, the second circumferential boss having a groove therein extending between the first and second outer spools so that the second fiber may be wound around the first outer spool and then passed through the groove to the second outer spool.

6. The fiber optic hydrophone of claim 4 wherein the first and second bosses are aligned to form an axis of symmetry of the interferometer such that the effects of linear acceleration have equal and opposite effects on the portion of the coiled optical fibers on opposite sides of the axis of symmetry to provide insensitivity of the interferometer to linear acceleration.

7. The fiber optic hydrophone of claim 4, further comprising a layer of an acoustic absorbing material connected between the backshell and the inner and outer mandrels.

8. The fiber optic hydrophone of claim 3 wherein the longitudinal passage through the tie rod is sealed to prevent fluid communication between the interior of the inner mandrel and the interior of the housing.

* * * * *